US011887286B2

(12) United States Patent
Tatae

(10) Patent No.: US 11,887,286 B2
(45) Date of Patent: Jan. 30, 2024

(54) IMAGE PROCESSING DEVICE AND IMAGE PROCESSING METHOD TO GENERATE IMAGE FOR OBJECT RECOGNITION

(71) Applicant: SONY SEMICONDUCTOR SOLUTIONS CORPORATION, Kanagawa (JP)

(72) Inventor: Yoshiaki Tatae, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 341 days.

(21) Appl. No.: 17/287,991

(22) PCT Filed: Aug. 2, 2019

(86) PCT No.: PCT/JP2019/030496
§ 371 (c)(1),
(2) Date: Apr. 22, 2021

(87) PCT Pub. No.: WO2020/090176
PCT Pub. Date: May 7, 2020

(65) Prior Publication Data
US 2021/0374923 A1   Dec. 2, 2021

(30) Foreign Application Priority Data
Nov. 2, 2018  (JP) .................................. 2018-207286

(51) Int. Cl.
*G06T 5/00* (2006.01)
*G06T 5/50* (2006.01)
(52) U.S. Cl.
CPC .............. *G06T 5/009* (2013.01); *G06T 5/006* (2013.01); *G06T 5/50* (2013.01)

(58) Field of Classification Search
CPC .......... G06T 5/007; G06T 5/008; G06T 5/20; G06T 7/136; G06T 5/50; G06T 5/009
See application file for complete search history.

(56) References Cited

U.S. PATENT DOCUMENTS 11,258,959 B2 *  2/2022  Rotte ..................... H04N 23/76
2006/0078222 A1 *  4/2006  Hwang .................. G06T 5/008
348/E5.041

(Continued)

FOREIGN PATENT DOCUMENTS

EP    2116972 A2    11/2009
JP    06-30330 A    2/1994

(Continued)

OTHER PUBLICATIONS

International Search Report and Written Opinion of PCT Application No. PCT/JP2019/030496, dated Oct. 21, 2019, 07 pages of ISRWO.

*Primary Examiner* — Li Liu
(74) *Attorney, Agent, or Firm* — CHIP LAW GROUP

(57) ABSTRACT

An image that enables proper object recognition is generated. An image processing device includes an image processing unit that processes an image. The image processing unit included in this image processing device corrects the level of a pixel constituting the image. That is, the image processing unit corrects the level of a target pixel constituting the image on the basis of a low-frequency component in a peripheral image of a pixel constituting the target image. Here, the peripheral image is made up of a plurality of pixels that includes the target pixel and is located around the target pixel.

12 Claims, 12 Drawing Sheets

(56) References Cited

U.S. PATENT DOCUMENTS

| | | | |
|---|---|---|---|
| 2009/0278957 A1 | 11/2009 | Tanaka | |
| 2017/0302858 A1* | 10/2017 | Porter | H04N 23/71 |
| 2018/0249044 A1* | 8/2018 | Ikari | G03G 15/5025 |
| 2019/0172186 A1* | 6/2019 | Liu | G06T 5/40 |
| 2022/0277429 A1* | 9/2022 | Matsunaga | A61B 5/444 |

FOREIGN PATENT DOCUMENTS

| | | |
|---|---|---|
| JP | 2008-028634 A | 2/2008 |
| JP | 2009-272983 A | 11/2009 |

\* cited by examiner

| LUMINANCE VALUE L1 OF TARGET PIXEL | TURNING ON OR OFF CORRECTION PROCESS |
|---|---|
| L1 ≤ TH1 | TURNED OFF |
| TH1 < L1 ≤ TH2 | VERIFIED ON BASIS OF HIGH-FREQUENCY COMPONENT OF PERIPHERAL IMAGE IN SHORT-TIME AGGREGATED IMAGE |
| TH2 < L1 | TURNED ON |

| HIGH-FREQUENCY COMPONENT HF1 OF PERIPHERAL IMAGE | TURNING ON OR OFF CORRECTION PROCESS |
|---|---|
| HF1 ≤ TH3 | TURNED ON |
| TH3 < HF1 ≤ TH4 | BLENDING PROCESS |
| TH4 < HF1 | TURNED OFF |

IMAGE PROCESSING DEVICE AND IMAGE PROCESSING METHOD TO GENERATE IMAGE FOR OBJECT RECOGNITION

CROSS REFERENCE TO RELATED APPLICATIONS

This application is a U.S. National Phase of International Patent Application No. PCT/JP2019/030496 filed on Aug. 2, 2019, which claims priority benefit of Japanese Patent Application No. JP 2018-207286 filed in the Japan Patent Office on Nov. 2, 2018. Each of the above-referenced applications is hereby incorporated herein by reference in its entirety.

TECHNICAL FIELD

The present disclosure relates to an image processing device and an image processing method. In more detail, the present disclosure relates to an image processing device and an image processing method that process image data generated by imaging.

BACKGROUND ART

Conventionally, imaging devices such as digital still cameras, digital video cameras (for example, camera-integrated recorders), and surveillance cameras that image a subject such as a person, an animal, and a vehicle to generate image data have become widespread. Furthermore, an imaging device that generates a proper image by subjecting the generated image data to various image processes has become widespread.

For example, in a case where an image generated by the imaging device contains a scene with a large difference between light and dark (for example, a backlit scene), a bright part of the generated image is saturated and overexposure is caused, or underexposure is caused in a dark part of the generated image in some cases. Thus, an imaging device capable of properly correcting gradation even in a scene with a large difference between light and dark (for example, a backlit scene) has been proposed (see, for example, Patent Document 1).

CITATION LIST

Patent Document

Patent Document 1: Japanese Patent Application Laid-Open No. 06-30330

SUMMARY OF THE INVENTION

Problems to be Solved by the Invention

In the above-mentioned prior art, an image rich in gradation expression can be obtained by properly correcting gradation in a scene with a large difference between light and dark (for example, a backlit scene).

Here, it is assumed that object recognition is performed using an image generated by the imaging device. For example, in a case where object recognition using the features of a changing part (for example, an edge) in an image is performed, it is important to use an image without overexposure or underexposure, but information on light that hits the object is no longer necessary. However, in the above-mentioned prior art, even if the gradation is corrected, information on light that hits the object remains, and accordingly there is a possibility that the recognition rate is deteriorated in a case where the object recognition is performed using the features of a changing part in the image.

The present disclosure has been made in view of the above-mentioned disadvantages, and an object of the present disclosure is to generate an image that enables proper object recognition.

Solutions to Problems

A first aspect of the present disclosure is an image processing device including an image processing unit that corrects a level of a target pixel constituting an image on the basis of a low-frequency component of a peripheral image of the target pixel, an image processing method for the image processing device, and a program that causes a computer to execute the image processing method.

Furthermore, in this first aspect, the image processing unit need not correct the level of the target pixel in a case where the level of the target pixel is small with respect to a first threshold value as a reference, and may correct the level of the target pixel in a case where the level of the target pixel is large with respect to a second threshold value as a reference, the second threshold value being a value larger than the first threshold value.

In addition, in this first aspect, the image processing unit may specify whether or not to correct the level of the target pixel, on the basis of a high-frequency component in a peripheral image of the target pixel in a case where the level of the target pixel is contained in a predetermined range with respect to the first threshold value and the second threshold value as references.

In addition, in this first aspect, the image processing unit may correct the level of the target pixel in a case where the high-frequency component is small with respect to a third threshold value as a reference, and need not correct the level of the target pixel in a case where the high-frequency component is large with respect to a fourth threshold value as a reference, the fourth threshold value being a value larger than the third threshold value.

In addition, in this first aspect, the image processing unit may perform a blending process of blending the target pixel whose level has been corrected and the target pixel whose level has not been corrected in a case where the high-frequency component is contained in a predetermined range with respect to the third threshold value and the fourth threshold value as references.

In addition, in this first aspect, the image processing unit may generate a gain for correcting the level of the target pixel on the basis of the low-frequency component.

In addition, in this first aspect, the image may include a composite image generated by compositing a first image and a second image, which is a darker image than the first image, the first image and the second image having been generated under different conditions, and the image processing unit may correct a level of the target pixel constituting the composite image on the basis of a low-frequency component in a peripheral image of a first pixel of the first image corresponding to the target pixel.

In addition, in this first aspect, the image processing unit need not correct the level of the target pixel constituting the composite image in a case where a level of the second pixel of the second image corresponding to the target pixel is small with respect to the first threshold value as a reference, and may correct the level of the target pixel in a case where the level of the second pixel is large with respect to the second threshold value as a reference, the second threshold value being a value larger than the first threshold value.

In addition, in this first aspect, the image processing unit may specify whether or not to correct the level of the target pixel constituting the composite image, on the basis of a high-frequency component in a peripheral image of the second pixel in a case where the level of the second pixel is contained in a predetermined range with respect to the first threshold value and the second threshold value as references.

In addition, in this first aspect, the image processing unit may correct the level of the target pixel constituting the composite image in a case where the high-frequency component is small with respect to the third threshold value as a reference, and may not correct the level of the target pixel in a case where the high-frequency component is large with respect to the fourth threshold value as a reference, the fourth threshold value being a value larger than the third threshold value.

In addition, in this first aspect, the image processing unit may perform a blending process of blending the target pixel constituting the composite image whose level has been corrected and the target pixel whose level has not been corrected in a case where the high-frequency component is contained in a predetermined range with respect to the third threshold value and the fourth threshold value as references.

In addition, in this first aspect, the image processing unit may generate a gain for correcting the level of the target pixel constituting the composite image on the basis of the low-frequency component in the peripheral image of the first pixel.

By adopting such an aspect, the effect that the level of the target pixel constituting the image is corrected on the basis of the low-frequency component in the peripheral image of the target pixel is exhausted.

MODE FOR CARRYING OUT THE INVENTION

Figure 1:
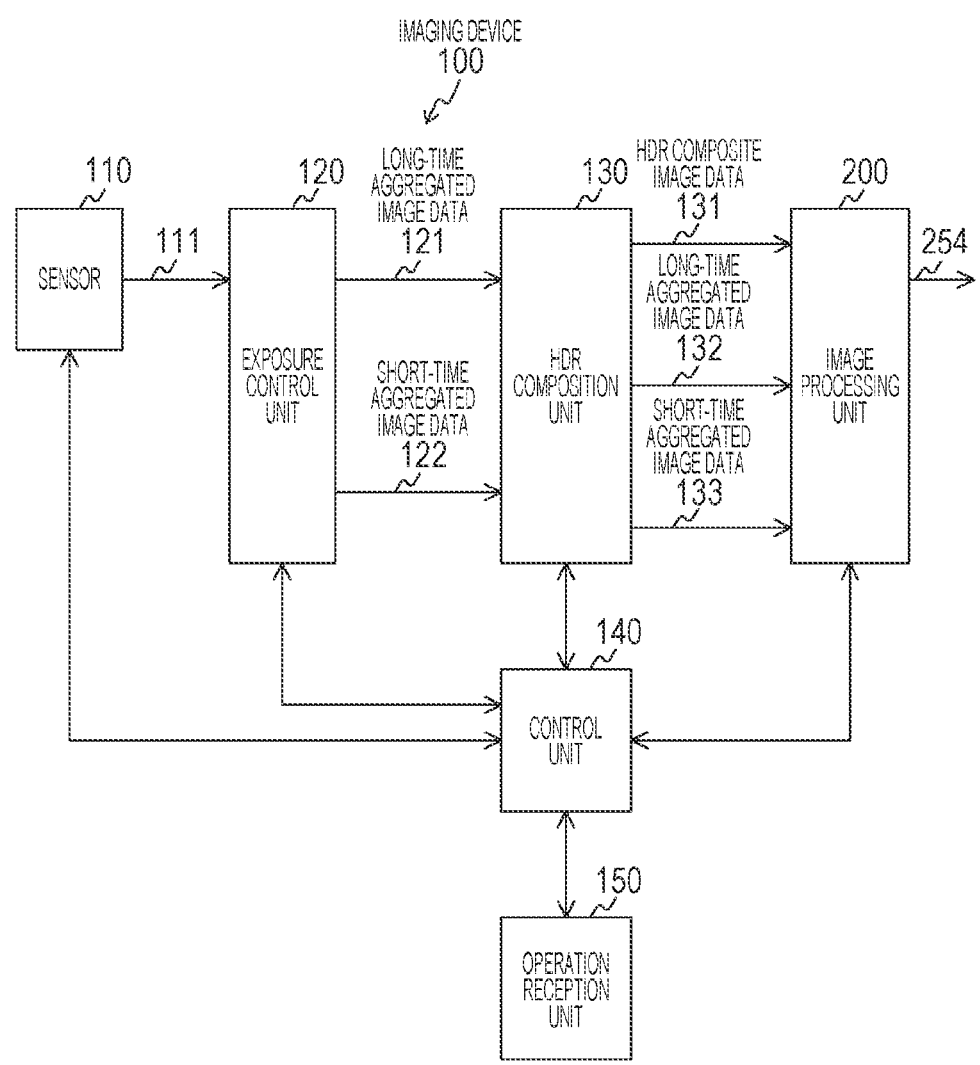
FIG. 1 is a diagram illustrating a configuration example of an imaging device 100 according to a first embodiment of the present disclosure.

Next, modes for carrying out the present disclosure (hereinafter, referred to as embodiments) will be described with reference to the drawings. In the drawings below, the same or resembling parts are denoted by the same or resembling reference numerals. In addition, the embodiments will be described in the following order.
1. First Embodiment
2. Second Embodiment
3. Third Embodiment
4. Fourth Embodiment 1. First Embodiment

[Configuration of Imaging Device]

FIG. 1 is a diagram illustrating a configuration example of an imaging device 100 according to a first embodiment of the present disclosure.

The imaging device 100 includes a sensor 110, an exposure control unit 120, a high dynamic range (HDR) composition unit 130, a control unit 140, an operation reception unit 150, and an image processing unit 200. The imaging device 100 is implemented by, for example, an instrument that generates a moving image or a still image used in a case where object recognition using the features of a changing part (for example, an edge) in an image is performed. Note that the imaging device 100 is an example of an image processing device described in the claims.

The sensor 110 is an imaging element (image sensor) that converts light on a subject incident through a lens into an electrical signal (image data) under the control of the control unit 140. Furthermore, the sensor 110 outputs the converted electrical signal (image data) to the exposure control unit 120 via a signal line 111. Note that, for example, a charge coupled device (CCD) or complementary metal oxide semiconductor (CMOS) sensor can be used as the sensor 110.

The exposure control unit 120 performs various exposure controls such as shutter control, gain control, and flash control under the control of the control unit 140. In addition, the exposure control unit 120 uses the electrical signal (image data) output from the sensor 110 to generate image data of a plurality of images having different setting conditions (a short-time aggregated image and a long-time aggregated image), on the basis of various setting contents. Then, the exposure control unit 120 outputs the image data of the generated long-time aggregated image to the HDR composition unit 130 via a signal line 121, and outputs the image data of the generated short-time aggregated image to the HDR composition unit 130 via a signal line 122.

The HDR composition unit 130 generates an HDR composite image by performing an HDR composition process on the image data (the short-time aggregated image and the long-time aggregated image) output from the exposure control unit 120, under the control of the control unit 140. For example, in a case where the level of a target pixel in the long-time aggregated image exceeds a reference value, the composition unit 130 performs a correction process based on the short-time aggregated image at the same coordinates as the coordinates of the target pixel.

Furthermore, the HDR composition unit 130 is capable of compressing the HDR composite image using a predetermined compression technology. For example, the HDR composition unit 130 can compress the composite image to 8-bit gradation. In this manner, in order to visually recognize an object, the HDR composition unit 130 can composite a plurality of images having different brightness, and output a high dynamic range image in a low-gradation format by gradation compression using tone reduction. Note that it is also possible to alter the output range by altering the desired value for compression.

In addition, the HDR composition unit 130 outputs the generated HDR composite image (for example, an image compressed to 8-bit gradation) to the image processing unit 200 via a signal line 131. The HDR composition unit 130 also outputs image data of the images (the short-time aggregated image and the long-time aggregated image) output from the exposure control unit 120 before the HDR composition process is performed, to the image processing unit 200. That is, the HDR composition unit 130 outputs the image data of the long-time aggregated image to the image processing unit 200 via a signal line 132, and outputs the image data of the short-time aggregated image to the image processing unit 200 via a signal line 133.

The control unit 140 controls each unit of the imaging device 100 on the basis of a control program saved in a memory (not illustrated). Furthermore, the control unit 140 controls each unit on the basis of an operation input received by the operation reception unit 150. The control unit 140 is implemented by, for example, a central processing unit (CPU).

The operation reception unit 150 is an operation reception unit that receives an operation input made by a user, and outputs operation information according to the received operation input to the control unit 140. The operation reception unit 140 is implemented by, for example, various operation members (for example, a button, a switch, and a touch panel), and external operation members (for example, a mouse and a keyboard).

The image processing unit 200 subjects the image data output from the HDR composition unit 130 to various image processes, and outputs the image data subjected to the image processes via a signal line 254. Note that, the image data subjected to the image processes by the image processing unit 200 is used, for example, for object recognition. Furthermore, the image data subjected to the image processes by the image processing unit 200 may be stored in a storage medium and used for object recognition. Note that the configuration of the image processing unit 200 will be described in detail with reference to FIG. 2. In addition, object recognition is, for example, object recognition (particularly biometric recognition) using the features of a changing part (for example, an edge) in an image. For example, the object recognition using the features of the changing part in the image includes the convolutional neural network (CNN), histogram of oriented gradient (HOG), and scale-invariant feature transform (SIFT).

[Configuration of Image Processing Unit]

Figure 2:
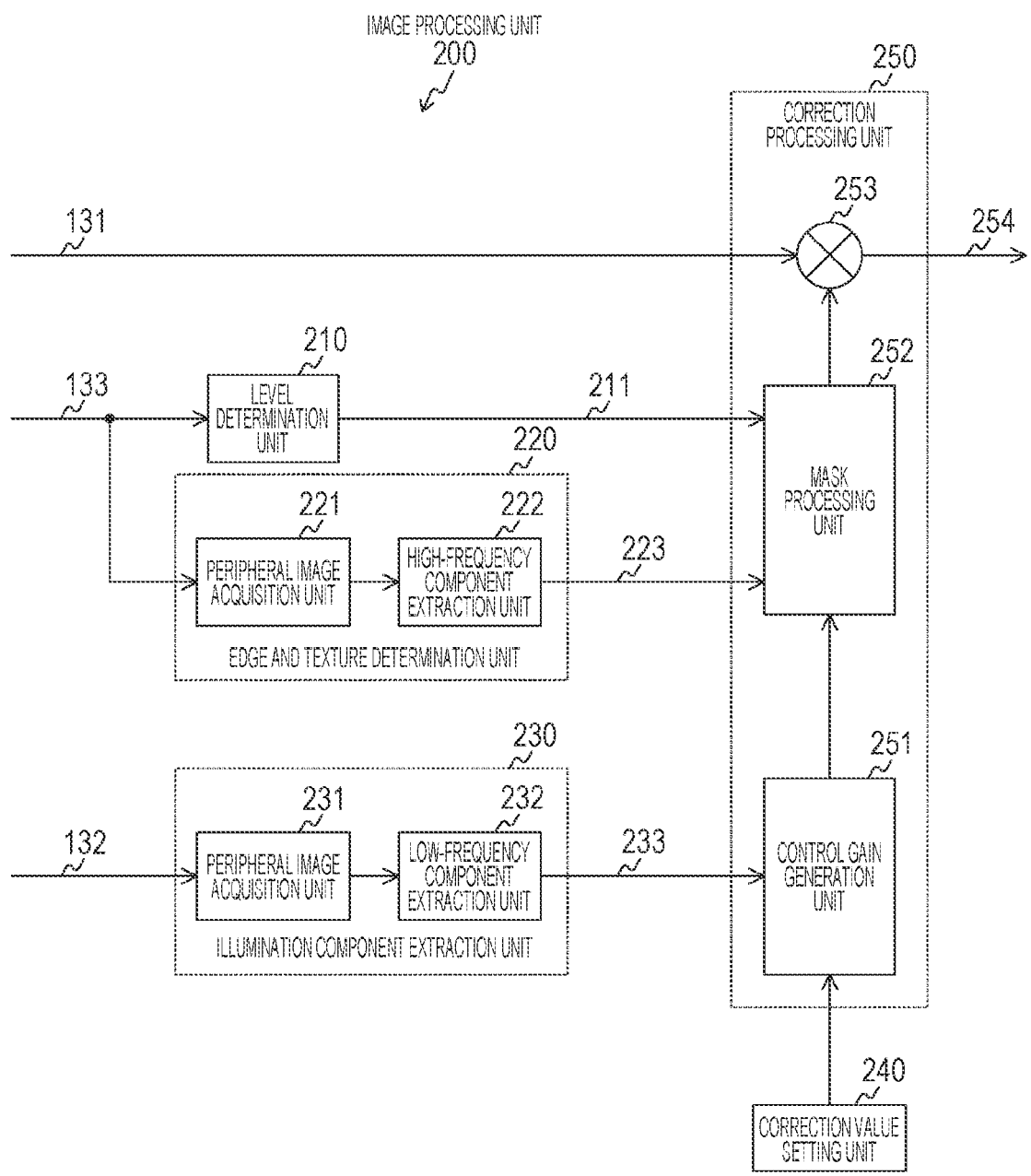
FIG. 2 is a diagram illustrating a configuration example of an image processing unit 200 according to the first embodiment of the present disclosure.

FIG. 2 is a diagram illustrating a configuration example of the image processing unit 200 according to the first embodiment of the present disclosure.

The image processing unit 200 includes a level determination unit 210, an edge and texture determination unit 220, an illumination component extraction unit 230, a correction value setting unit 240, and a correction processing unit 250.

The level determination unit 210 determines the level of each pixel constituting the image data (short-time aggregated image data) output from the HDR composition unit 130 (illustrated in FIG. 1) via the signal line 133. Then, the level determination unit 210 outputs the determined level to a mask processing unit 252 via a signal line 211. Note that a luminance value (a density value and a gradation value), a pixel value (the level of the whole sensor output), or the like can be used as the level of the pixel. However, since the pixel value has a value that changes depending on the structure of the color filter of the sensor, it is preferable to use the luminance value that can maintain the performance regardless of the structure of the color filter. For this reason, in the first embodiment, an example in which the luminance value is used as the level of the pixel will be demonstrated.

The edge and texture determination unit 220 includes a peripheral image acquisition unit 221 and a high-frequency component extraction unit 222.

The peripheral image acquisition unit 221 acquires an image in a predetermined range that is located around the target pixel among all pixels constituting the image data (short-time aggregated image data) output from the HDR composition unit 130 (illustrated in FIG. 1) via the signal line 133. Then, the peripheral image acquisition unit 221 outputs the image data of the acquired image (peripheral image) to the high-frequency component extraction unit 222. Note that the target pixel and the peripheral image will be described in detail with reference to FIGS. 3A, 3B, and 3C.

The high-frequency component extraction unit 222 extracts a high-frequency component from the image data of the peripheral image output from the peripheral image acquisition unit 221. Then, the high-frequency component extraction unit 222 outputs the extracted high-frequency component (high-frequency component value) to the mask processing unit 252 via a signal line 223.

The illumination component extraction unit 230 includes a peripheral image acquisition unit 231 and a low-frequency component extraction unit 232.

The peripheral image acquisition unit 231 acquires an image in a predetermined range that is located around the target pixel among all pixels constituting the image data (long-time aggregated image data) output from the HDR composition unit 130 (illustrated in FIG. 1) via the signal line 132. Then, the peripheral image acquisition unit 231 outputs the image data of the acquired image (peripheral image) to the low-frequency component extraction unit 232. Note that the target pixel and the peripheral image will be described in detail with reference to FIGS. 3A, 3B, and 3C.

The low-frequency component extraction unit 232 extracts a low-frequency component from the image data of the peripheral image output from the peripheral image acquisition unit 231. Then, the low-frequency component extraction unit 232 outputs the extracted low-frequency component (low-frequency component value) to a control gain generation unit 251 via a signal line 233.

The correction value setting unit 240 holds a parameter (set value) used when the control gain generation unit 251 generates a control gain, and supplies the held parameter (set value) to the control gain generation unit 251. Note that the parameter (set value) held in the correction value setting unit 240 can be altered on the basis of a user operation using the operation reception unit 150 (illustrated in FIG. 1).

In addition, for example, a desired value for compression can be used as the set value. For example, in a case where the image processing unit 200 simply compresses an image to 8-bit gradation, 128 (=256/2) can be set as the set value. Furthermore, an average luminance value of learning images used for object recognition may be used as the set value. Note that these set values are examples and can be appropriately altered by user setting.

The correction processing unit 250 includes the control gain generation unit 251, the mask processing unit 252, and a multiplier 253.

The control gain generation unit 251 generates a gain by which the target pixel in an input image (signal line 131) is to be multiplied, on the basis of a value (set value) supplied from the correction value setting unit 240 and a value (low-frequency component value) output from the low-frequency component extraction unit 232. Furthermore, the control gain generation unit 251 outputs the generated gain to the mask processing unit 252.

The mask processing unit 252 specifies whether or not to perform the correction process on the target pixel in the input image (signal line 131), on the basis of a value (luminance value) output from the level determination unit 210 and a value (high-frequency component value) output from the high-frequency component extraction unit 222. Specifically, the mask processing unit 252 specifies whether or not to multiply the target pixel in the input image (signal line 131) by the gain, on the basis of a value (luminance value) output from the level determination unit 210 and a value (high-frequency component value) output from the high-frequency component extraction unit 222. Furthermore, in a case where the mask processing unit 252 verifies that the target pixel in the input image (HDR composite image) is to be multiplied by the gain, the mask processing unit 252 outputs the gain output from the control gain generation unit 251 to the multiplier 253.

The multiplier 253 multiplies the image data (HDR composite image) output from the HDR composition unit 130 (illustrated in FIG. 1) via the signal line 131 by the gain output from the mask processing unit 252, and outputs the multiplication result to the signal line 254.

Example of Relationship Between Each Image, Target Pixel, and Peripheral Image

Figure 3A:
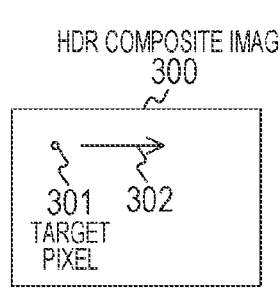
FIGS. 3A, 3B, and 3C are diagrams illustrating an example of a relationship between each image, a target pixel, and a peripheral image used for a correction process by the image processing unit 200 according to the first embodiment of the present disclosure.
Figure 3B:
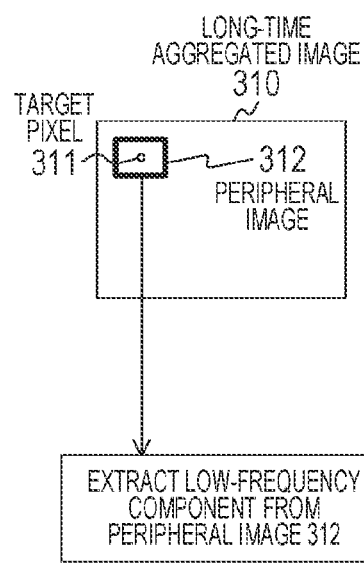
Figure 3C:
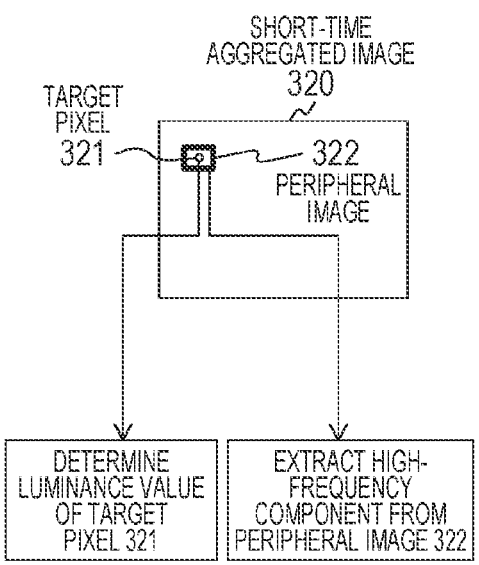

FIGS. 3A, 3B, and 3C are diagrams illustrating an example of a relationship between each image, a target pixel, and a peripheral image used for the correction process by the image processing unit 200 according to the first embodiment of the present disclosure. In FIGS. 3A, 3B, and 3C, an HDR composite image 300 corresponding to each piece of image data output from the HDR composition unit 130 (illustrated in FIG. 1), a long-time aggregated image 310, and a short-time aggregated image 320 are schematically illustrated as rectangles. Note that the long-time aggregated image 310 is an example of a first image described in the claims. Furthermore, the short-time aggregated image 320 is an example of a second image described in the claims.

In addition, in FIGS. 3A, 3B, and 3C, a pixel to be subjected to the correction process by the correction processing unit 250 is denoted as a target pixel 301, and pixels in the long-time aggregated image 310 and the short-time aggregated image 320 corresponding to the position of the pixel 301 are illustrated as target pixels 311 and 321.

Besides, in FIGS. 3A, 3B, and 3C, the peripheral images used in the correction process by the correction processing unit 250 are illustrated as peripheral images 312 and 322 by thick line rectangles. Here, the peripheral image 312 is an image located around the target pixel 311 with the target pixel 311 as a center (an image located within a predetermined range from the target pixel 312). Likewise, the peripheral image 322 is an image located around the target pixel 321 with the target pixel 321 as a center (an image located within a predetermined range from the target pixel 322).

For example, in a case where each of the HDR composite image 300, the long-time aggregated image 310, and the short-time aggregated image 320 has 640 pixels×480 pixels, the range of the peripheral image 312 can be defined as 25 pixels×25 pixels, and the range of the peripheral image 322 can be defined as 5 pixels×5 pixels. Note that these ranges of the peripheral images 312 and 322 are examples, and other ranges may be used. For example, the ranges of the peripheral images 312 and 322 may be specified in line with spatial frequency information of an image desired to be acquired. For example, the ranges of the peripheral images 312 and 322 can be specified on the basis of a required cutoff frequency.

For example, the cutoff frequency can be worked out by following formula 1. Note that the cutoff frequency is a frequency that serves as a boundary between the pass band and the cutoff band in a filter circuit.

$$\text{Cutoff frequency} = \{0.443/\sqrt{(N^2-1)}\} \times \text{Nyquist Frequency} \quad \text{Formula 1}$$

In the above formula, N denotes the number of pixels contained in the image range. Furthermore, the Nyquist frequency=1/(pixel pitch×2) is established. Note that the pixel pitch means an interval between center lines of pixels constituting the imaging element.

The ranges of the peripheral images 312 and 322 can be specified by working out N that achieves the required cutoff frequency, on the basis of formula 1 described above.

Furthermore, the correction processing unit 250 verifies whether or not the correction process is necessary for every pixel constituting the HDR composite image 300. Specifically, the correction processing unit 250 advances the target pixel 301 by one pixel at a time from the position of the upper left corner to the position of the lower right corner in the HDR composite image 300 as indicated by an arrow 302. That is, the target pixel 301 advances one pixel at a time in the horizontal direction from the position of the upper left corner in the HDR composite image 300, and in a case where the rightmost position is reached, returns to the leftmost position to advance one pixel in the vertical direction. Thereafter, the target pixel 301 similarly advances one pixel at a time in the horizontal direction, and in a case where the rightmost position is reached, returns to the leftmost position to advance one pixel in the vertical direction until reaching the position of the lower right corner.

As illustrated in FIG. 3B, a low-frequency component is extracted from the peripheral image 312 in the long-time aggregated image 310. For example, the low-frequency component extraction unit 232 (illustrated in FIG. 2) calculates an average value of luminance values of respective pixels constituting the peripheral image (25 pixels×25 pixels) acquired by the peripheral image acquisition unit 231 (illustrated in FIG. 2). Then, the low-frequency component extraction unit 232 outputs the calculated average value as a low-frequency component to the control gain generation unit 251 (illustrated in FIG. 2). Note that a predetermined filter circuit (for example, a filter circuit that takes out a low-frequency component (such as a low-pass filter)) may be used as the low-frequency component extraction unit 232.

Furthermore, the control gain generation unit 251 generates a gain on the basis of the low-frequency component extracted by the low-frequency component extraction unit 232. Specifically, the control gain generation unit 251 performs a predetermined computation (set value/low-frequency component value) on the basis of the value (set value) set in the correction value setting unit 240 and the low-frequency component extracted from the peripheral image 312. Note that this computation (set value/low-frequency component value) is an example, and the gain may be generated by another computation using the value (set value) set in the correction value setting unit 240 and the low-frequency component extracted from the peripheral image 312.

As illustrated in FIG. 3C, the level of the luminance value of the target pixel 321 in the short-time aggregated image 320 is determined. For example, the level determination unit 210 (illustrated in FIG. 2) acquires the luminance value of the target pixel 321 in the short-time aggregated image 320, and outputs the acquired luminance value to the mask processing unit 252 (illustrated in FIG. 2).

Furthermore, as illustrated in FIG. 3C, a high-frequency component is extracted from the peripheral image 322 in the short-time aggregated image 320. For example, the high-frequency component extraction unit 222 (illustrated in FIG. 2) calculates an average value of luminance values of respective pixels constituting the peripheral image (5 pixels×5 pixels) acquired by the peripheral image acquisition unit 221 (illustrated in FIG. 2), and calculates a value obtained by subtracting this average value from the luminance value of the target pixel 321. Then, the high-frequency component extraction unit 222 outputs the calculated value (a value obtained by subtracting the average value from the luminance value of the target pixel 321) as a high-frequency component to the mask processing unit 252 (illustrated in FIG. 2). Note that a predetermined filter circuit (for example, a filter circuit that takes out a high-frequency component (such as a high-pass filter)) may be used as the high-frequency component extraction unit 222.

Furthermore, the mask processing unit 252 specifies whether or not to perform the correction process, on the basis of the luminance value of the target pixel 321 acquired by the level determination unit 210 and the high-frequency component extracted by the high-frequency component extraction unit 222. Note that this specification process will be described in detail with reference to FIGS. 4A, 4B, 5A, 5B and 6.

Example of Specification of Correction Process for Target Pixel

Figures 4A, 4B:
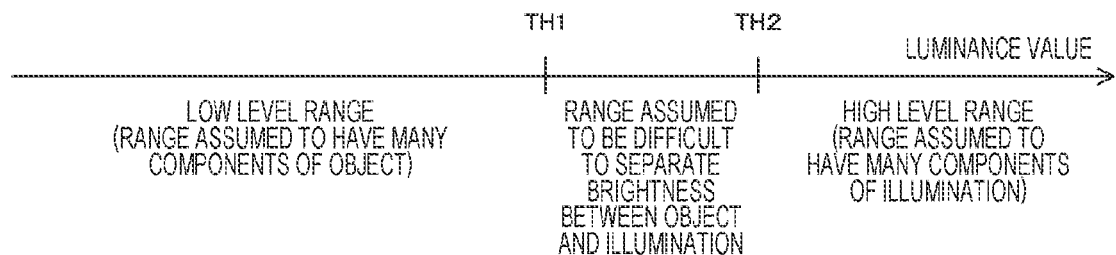
FIGS. 4A and 4B are diagrams illustrating a relationship between threshold values TH1 and TH2 for level and a level L1 of the target pixel used for specifying the correction process by a mask processing unit 252 according to the first embodiment of the present disclosure.

FIGS. 4A and 4B are diagrams illustrating a relationship between threshold values TH1 and TH2 for level and a level L1 of the target pixel used for specifying the correction process by the mask processing unit 252 according to the first embodiment of the present disclosure.

FIG. 4A illustrates a relationship between the luminance value of the target pixel 321 in the short-time aggregated image 320 (illustrated in FIG. 3C) and the threshold values TH1 and TH2. Note that the lateral axis illustrated in FIG. 4A is an axis indicating the level of the luminance value of the target pixel, and the level increases as advancing from the left side to the right side.

The threshold values TH1 and TH2 are threshold values (reference levels) used when the turning on or off the correction process is specified, and TH1<TH2 is established.

For example, a desired value for compression can be used as the threshold value TH1 as in the above-mentioned set value. Furthermore, an average luminance value of learning images used for object recognition may be used as the threshold value TH1. Note that the threshold value TH1 indicated here is an example, and may be appropriately altered by user setting.

The threshold value TH2 can be defined as, for example, a level at which the composition between the short-time aggregated image (dark image) and the long-time aggregated image (bright image) is started in the HDR composition process. Here, in the HDR composition process, the level at which the composition between the short-time aggregated image and the long-time aggregated image is started can be defined as, for example, a value of about 90% to 95% of a value at which the level of the long-time aggregated image (bright image) is saturated. Furthermore, for example, in the HDR composition process, the level at which the composition between the short-time aggregated image and the long-time aggregated image is started can be defined as a value of about 90% to 95% of a value at which the level of a sensor capable of generating the long-time aggregated image (bright image) is saturated.

FIG. 4B illustrates a relationship between the luminance value L1 of the target pixel 321 in the short-time aggregated image 320 (illustrated in FIG. 3C), the high-frequency component extracted from the peripheral image 322 in the short-time aggregated image 320, and the turning on or off the correction process.

As illustrated in FIG. 4A, in a case where the luminance value L1 of the target pixel 321 in the short-time aggregated image 320 is equal to or smaller than the threshold value TH1, the target pixel 321 is highly likely to be contained in a range assumed to have many components of an object. Thus, in a case where the luminance value L1 of the target pixel 321 in the short-time aggregated image 320 is equal to or smaller than the threshold value TH1, the correction process is turned off as illustrated in FIG. 4B. That is, the gain by which the target pixel in the input image (HDR composite image) is to be multiplied is defined as one.

Furthermore, as illustrated in FIG. 4A, in a case where the luminance value L1 of the target pixel 321 in the short-time aggregated image 320 (illustrated in FIG. 3C) is greater than the threshold value TH2, the target pixel 321 is highly likely to be contained in a range assumed to have many components of illumination. Thus, in a case where the luminance value L1 of the target pixel 321 in the short-time aggregated image 320 is greater than the threshold value TH2, the correction process is turned on such that the illumination component is eliminated, as illustrated in FIG. 4B. That is, the gain by which the target pixel in the input image (HDR composite image) is to be multiplied is defined as "set value/low-frequency component value".

Here, a case where the value (set value) held in the correction value setting unit 240 and the threshold value TH1 are defined as the same value is assumed. Note that the short-time aggregated image 320 is a dark image, and the long-time aggregated image is a bright image. Therefore, in a case where the luminance value L1 of the target pixel 321 of the short-time aggregated image 320 is greater than the threshold value TH1, the low-frequency component extracted from the peripheral image 312 of the long-time aggregated image 310 (the average value of the luminance values of respective pixels) is expected to be given as a value greater than the threshold value TH1. For this reason, the gain (set value/low-frequency component value) to be calculated is given as a value smaller than one.

Furthermore, as illustrated in FIG. 4A, in a case where the luminance value L1 of the target pixel 321 in the short-time aggregated image 320 (illustrated in FIG. 3C) is greater than the threshold value TH1 but equal to or smaller than the threshold value TH2, the target pixel 321 is highly likely to be contained in a range that is difficult to verify as to whether to have many components of an object or many components of illumination. Thus, in a case where the luminance value L1 of the target pixel 321 in the short-time aggregated image 320 is greater than the threshold value TH1 but equal to or smaller than the threshold value TH2, the turning on or off the correction process is verified on the basis of the high-frequency component extracted from the peripheral image 322 in the short-time aggregated image 320, as illustrated in FIG. 4B. This example of specification of the correction process will be described in detail with reference to FIGS. 5A and 5B.

Figures 5A, 5B:
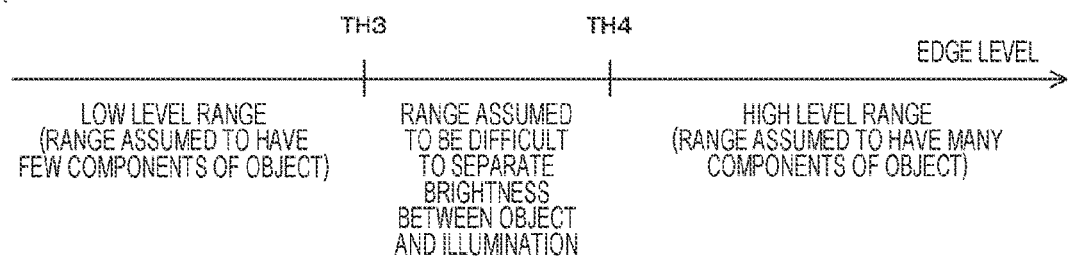
FIGS. 5A and 5B are diagrams illustrating a relationship between threshold values TH3 and TH4 for level and a high-frequency component HF1 extracted from the peripheral image, which are used for specifying the correction process by the mask processing unit 252 according to the first embodiment of the present disclosure.

FIGS. 5A and 5B is a diagram illustrating a relationship between threshold values TH3 and TH4 for level and a high-frequency component HF1 extracted from the peripheral image, which are used for specifying the correction process by the mask processing unit 252 according to the first embodiment of the present disclosure.

FIG. 5A illustrates a relationship between the high-frequency component HF1 extracted from the peripheral image 322 in the short-time aggregated image 320 and the threshold values TH3 and TH4. Note that the lateral axis illustrated in FIG. 5A is an axis indicating the level of the high-frequency component extracted from the peripheral image in the short-time aggregated image, and the level increases as advancing from the left side to the right side.

The threshold values TH3 and TH4 are threshold values (reference levels) used when the turning on or off the correction process is specified, and TH3<TH4 is established.

The threshold values TH3 and TH4 can be set, for example, by fine adjustment according to a scene on the entire screen from the image. For example, adjustment can be made while the reaction or the like (for example, the recognition rate for an object) in an object recognition process (such as CNN, HOG, and SIFT) is being observed. For example, in a case where the spatial frequency of a scene on the entire screen from the image is high (for example, in the case of an image having many high-frequency regions), both of the threshold values TH3 and TH4 can be set high. On the other hand, in a case where the spatial frequency of a scene on the entire screen from the image is low (for example, in the case of an image having many low-frequency regions), both of the threshold values TH3 and TH4 can be set low. Furthermore, in a case where, for example, a scene on the entire screen from the image contains diverse spatial frequencies, setting to widen the interval between the threshold values TH3 and TH4 can be made.

FIG. 5B illustrates a relationship between the high-frequency component HF1 extracted from the peripheral image 322 in the short-time aggregated image 320, the threshold values TH3 and TH4, and the turning on or off the correction process.

As illustrated in FIG. 5A, in a case where the high-frequency component HF1 extracted from the peripheral image 322 in the short-time aggregated image 320 (illustrated in FIG. 3C) is equal to or smaller than the threshold value TH3, the target pixel 321 is highly likely to be contained in a range assumed to have a few components of an object (for example, edge components). Thus, in a case where the high-frequency component HF1 extracted from the peripheral image 322 in the short-time aggregated image 320 is equal to or smaller than the threshold value TH3, the correction process is turned on such that the illumination component is eliminated, as illustrated in FIG. 5B. That is, the gain by which the target pixel in the input image (HDR composite image) is to be multiplied is defined as "set value/low-frequency component value".

Furthermore, as illustrated in FIG. 5A, in a case where the high-frequency component HF1 extracted from the peripheral image 322 in the short-time aggregated image 320 (illustrated in FIG. 3C) is greater than the threshold value TH4, the target pixel 321 is highly likely to be contained in a range assumed to have many components of an object (for example, edge components). Thus, in a case where the high-frequency component HF1 extracted from the peripheral image 322 in the short-time aggregated image 320 is greater than the threshold value TH4, the correction process is turned off, as illustrated in FIG. 5B. That is, the gain by which the target pixel in the input image (HDR composite image) is to be multiplied is defined as one.

Furthermore, as illustrated in FIG. 5A, in a case where the high-frequency component HF1 extracted from the peripheral image 322 is greater than the threshold value TH3 but equal to or smaller than the threshold value TH4, the target pixel 321 is highly likely to be contained in a range that is difficult to verify as to whether to have many components of an object or many components of illumination. Thus, in a case where the high-frequency component HF1 extracted from the peripheral image 322 is greater than the threshold value TH3 but equal to or smaller than the threshold value TH4, the blending process for an image is performed, as illustrated in FIG. 5B.

The blending process for an image is a process of blending an image subjected to the correction process (an image with the correction process turned on) and an image not subjected to the correction process (an image with the correction process turned off) at a predetermined ratio. Specifically, a blend ratio BR1 at which the image with the correction process turned on and the image with the correction process turned off are blended is calculated on the basis of following formula 2.

$$BR1=(HF1-TH3)/(TH4-TH3) \quad \text{Formula 2}$$

In the above formula, $TH3 \leq HF1 < TH4$ is established.

This blending process can be performed by the correction processing unit 250. Specifically, a gain based on the above-mentioned blend ratio BR1 is calculated by the control gain generation unit 251, and this calculated gain is input to the multiplier 253 such that the image data is multiplied by the input gain. With this procedure, the blending process can be performed.

Figure 6:
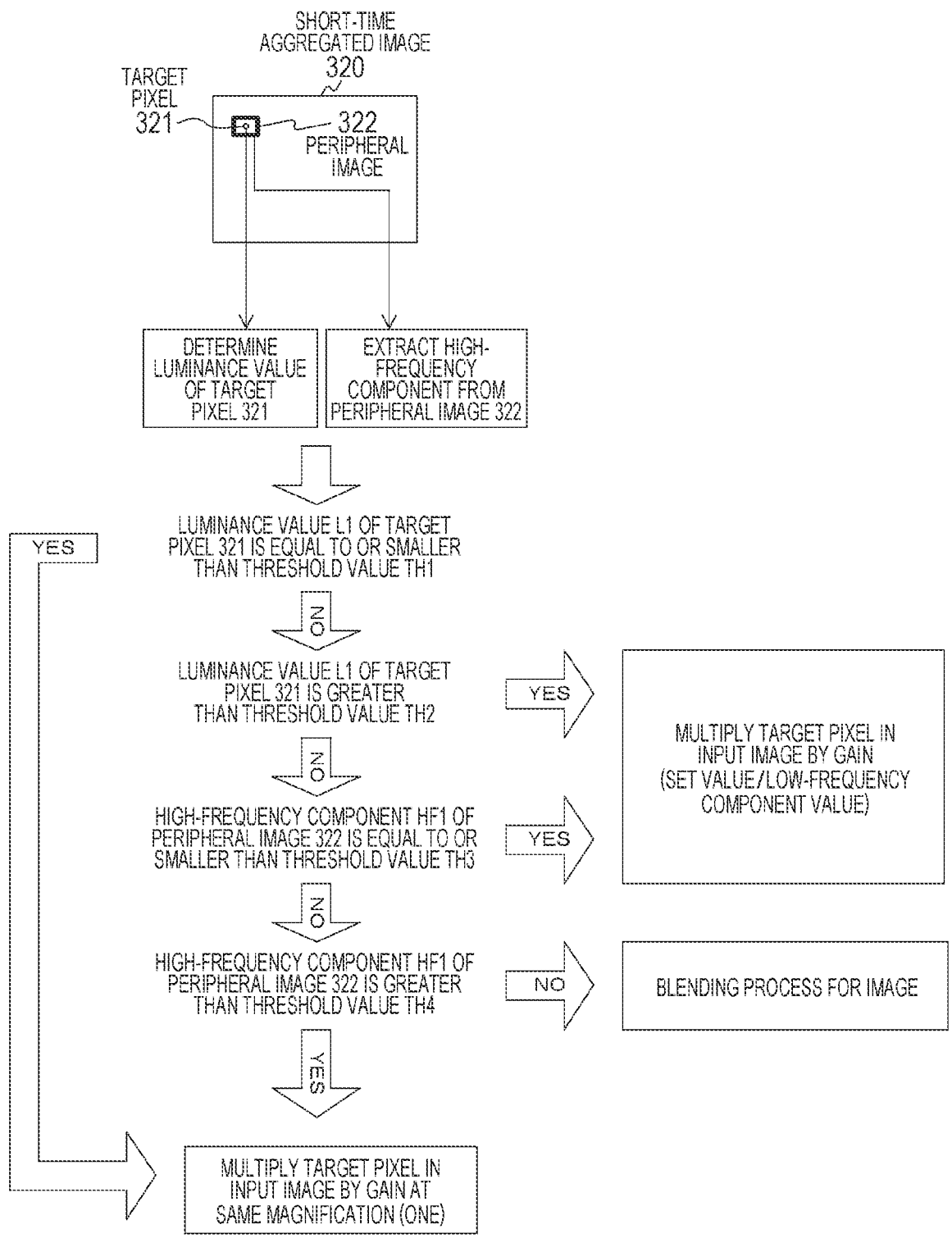
FIG. 6 is a diagram schematically illustrating a flow of specification of the correction process by the mask processing unit 252 according to the first embodiment of the present disclosure.

FIG. 6 is a diagram schematically illustrating a flow of specification of the correction process by the mask processing unit 252 according to the first embodiment of the present disclosure.

First, as illustrated in FIG. 3C, the level determination unit 210 determines the level of the luminance value of the target pixel 321 in the short-time aggregated image 320, and the high-frequency component extraction unit 222 extracts the high-frequency component from the peripheral image 322 in the short-time aggregated image 320.

Next, the mask processing unit 252 verifies whether or not the luminance value L1 of the target pixel 321 is equal to or smaller than the threshold value TH1. Then, in a case where the luminance value L1 of the target pixel 321 is equal to or smaller than the threshold value TH1, the mask processing unit 252 specifies to turn off the correction process. In this case, the gain by which the target pixel in the input image (HDR composite image) is to be multiplied is defined as one.

Furthermore, in a case where the luminance value L1 of the target pixel 321 is greater than the threshold value TH1, the mask processing unit 252 verifies whether or not the luminance value L1 of the target pixel 321 is greater than the threshold value TH2. Then, in a case where the luminance value L1 of the target pixel 321 is greater than the threshold value TH2, the mask processing unit 252 specifies to turn on the correction process. In this case, the multiplier 253 multiplies the target pixel in the input image (HDR composite image) by the gain (set value/low-frequency component value) generated by the control gain generation unit 251.

In addition, in a case where the luminance value L1 of the target pixel 321 is greater than the threshold value TH1 but equal to or smaller than the threshold value TH2, the mask processing unit 252 verifies whether or not the high-frequency component HF1 is equal to or smaller than the threshold value TH3. Then, in a case where the high-frequency component is equal to or smaller than the threshold value TH3, the mask processing unit 252 specifies to turn on the correction process. In this case, the multiplier 253 multiplies the target pixel in the input image (HDR composite image) by the gain (set value/low-frequency component value) generated by the control gain generation unit 251.

Furthermore, in a case where the high-frequency component is greater than the threshold value TH3, the mask processing unit 252 verifies whether or not the high-frequency component is greater than the threshold value TH4. Then, in a case where the high-frequency component is greater than the threshold value TH4, the mask processing unit 252 specifies to turn off the correction process. In this case, the gain by which the target pixel in the input image (HDR composite image) is to be multiplied is defined as one.

In addition, in a case where the high-frequency component is greater than the threshold value TH3 but equal to or smaller than the threshold value TH4, the mask processing unit 252 specifies to perform the blending process for the image. This blending process is performed on the basis of the blend ratio BR1 calculated using formula 2 described above.

In this manner, the image processing unit 200 can extract the illumination component (for example, a pixel whose luminance value L1 is greater than the threshold value TH1) from the image, and correct the level of the pixel having the extracted illumination component. That is, the image processing unit 200 can preferentially correct a component having a high luminance value in the image.

Furthermore, the image processing unit 200 can extract a component of high illumination (a low-frequency component in the peripheral image 312 of the long-time aggregated image 310) from the image, and use the extracted component for correcting the level of the above-mentioned pixel having the extracted illumination component. For example, the image processing unit 200 can generate a gain on the basis of a component of high illumination in the image (a low-frequency component in the peripheral image 312 of the long-time aggregated image 310), and use this gain to correct the level of the above-mentioned pixel having the extracted illumination component.

In addition, the image processing unit 200 can extract a component of low illumination in the image (a high-frequency component in the peripheral image 322 of the short-time aggregated image 320), and use the extracted component for correcting the level of the above-mentioned pixel having the extracted illumination component. Besides, for example, the image processing unit 200 can determine a place assumed to be an object in the image on the basis of a component of low illumination in the image (a high-frequency component in the peripheral image 322 of the short-time aggregated image 320). Then, the image processing unit 200 can specify whether or not to correct the level of the above-mentioned pixel having the extracted illumination component, on the basis of the determination result. Consequently, the correction for an edge portion in the image can be suppressed.

Example of Action of Imaging Device

Figure 7:
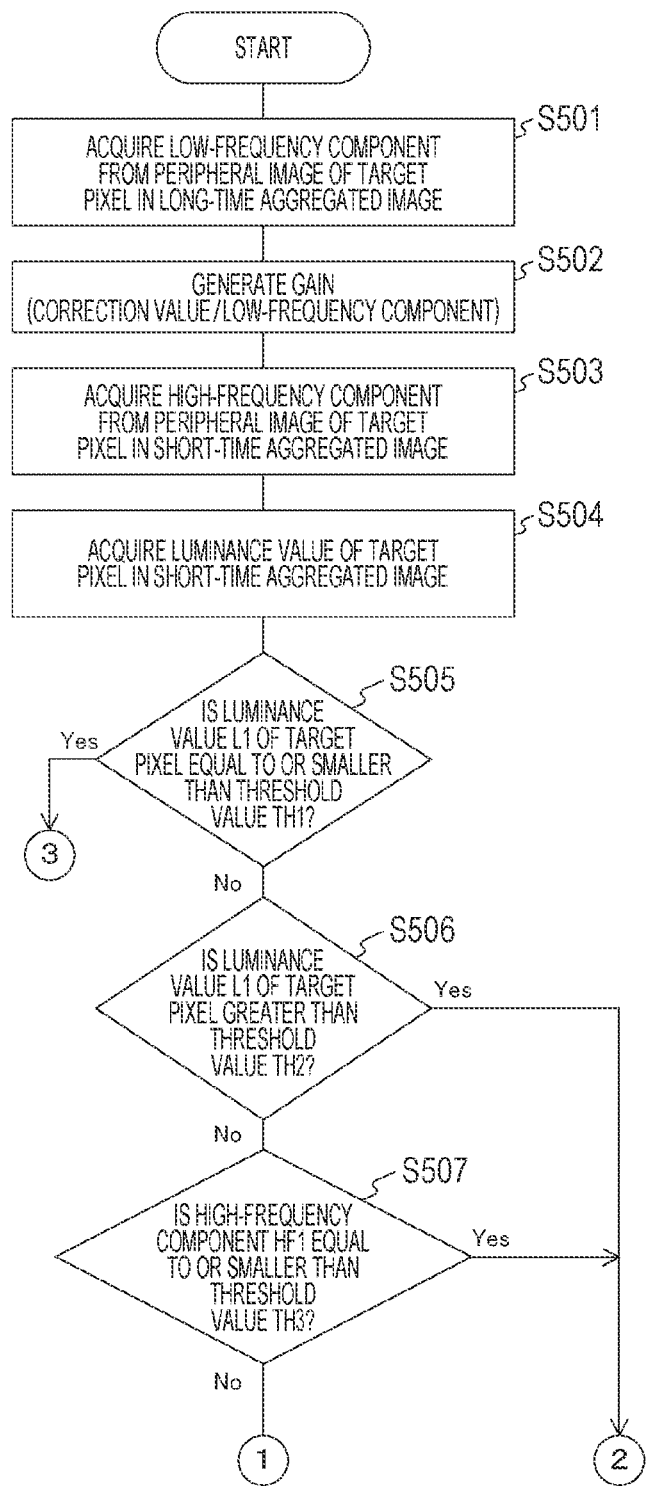
FIG. 7 is a flowchart illustrating an example of a processing procedure of the correction process by the imaging device 100 according to the first embodiment of the present disclosure.
Figure 8:
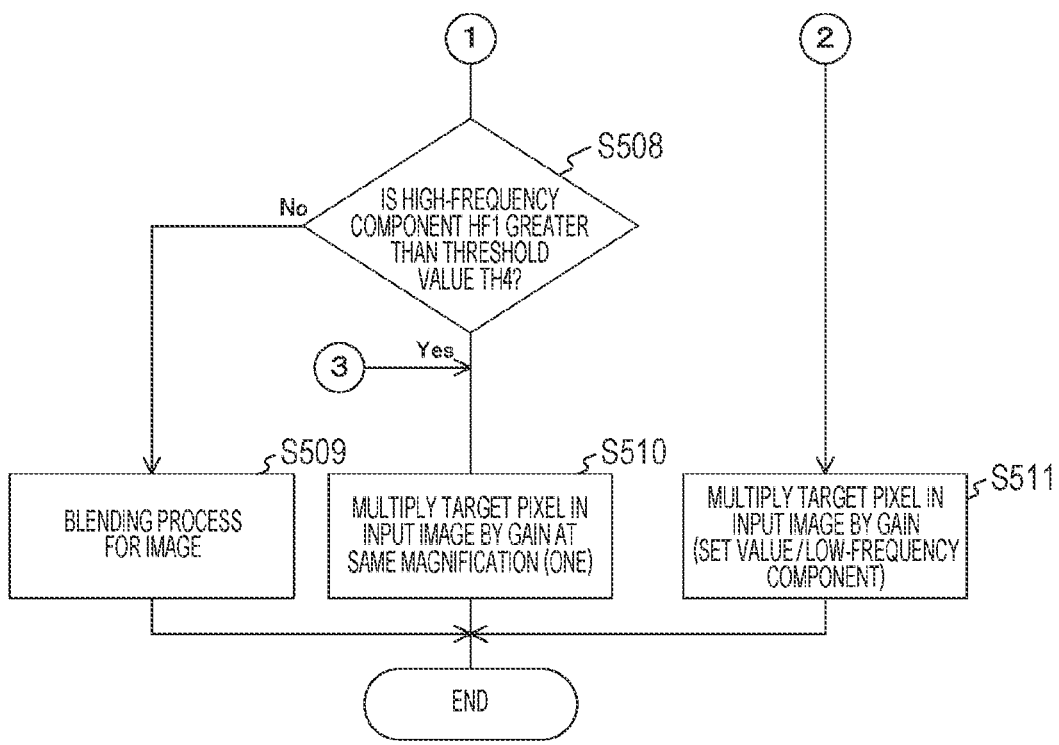
FIG. 8 is a flowchart illustrating an example of a processing procedure of the correction process by the imaging device 100 according to the first embodiment of the present disclosure.

FIGS. 7 and 8 are flowcharts illustrating an example of a processing procedure of the correction process by the imaging device 100 according to the first embodiment of the present disclosure. Note that this example of action will be described with reference to each constituent member illustrated in FIG. 2 and each image illustrated in FIGS. 3A, 3B, and 3C.

First, the low-frequency component extraction unit 232 extracts the low-frequency component value from the peripheral image 312 (long-time aggregated image 310) acquired by the peripheral image acquisition unit 231 (step S501).

Next, the control gain generation unit 251 generates a gain on the basis of the value (set value) set in the correction value setting unit 240 and the extracted low-frequency component (step S502).

Next, the high-frequency component extraction unit 222 extracts the high-frequency component from the peripheral image 322 (short-time aggregated image 320) acquired by the peripheral image acquisition unit 221 (step S503).

Next, the level determination unit 210 acquires the luminance value of the target pixel 321 in the short-time aggregated image 320 to determine the level (step S504).

Next, the mask processing unit 252 verifies whether or not the luminance value L1 of the target pixel 321 in the short-time aggregated image 320 is equal to or smaller than the threshold value TH1 (step S505). Then, in a case where the luminance value L1 of the target pixel 321 in the short-time aggregated image 320 is equal to or smaller than the threshold value TH1 (step S505), the mask processing unit 252 specifies to turn off the correction process (step S510). In this case, the gain by which the target pixel 301 in the input image (HDR composite image 300) is to be multiplied is defined as one (step S510).

Furthermore, in a case where the luminance value L1 of the target pixel 321 in the short-time aggregated image 320 is greater than the threshold value TH1 (step S505), the mask processing unit 252 verifies whether or not the luminance value L1 of the target pixel 321 in the short-time aggregated image 320 is greater than the threshold value TH2 (step S506). Then, in a case where the luminance value L1 of the target pixel 321 in the short-time aggregated image 320 is greater than the threshold value TH2 (step S506), the mask processing unit 252 specifies to turn on the correction process (step S511). In this case, the multiplier 253 multiplies the target pixel 301 in the input image (HDR composite image 300) by the gain (set value/low-frequency component value) generated by the control gain generation unit 251 (step S511).

In addition, in a case where the luminance value L1 of the target pixel 321 in the short-time aggregated image 320 is equal to or smaller than the threshold value TH2 (step S506), the mask processing unit 252 verifies whether or not the high-frequency component HF1 is equal to or smaller than the threshold value TH3 (step S507). Then, in a case where the high-frequency component HF1 is equal to or smaller than the threshold value TH3 (step S507), the mask processing unit 252 specifies to turn on the correction process (step S511). In this case, the multiplier 253 multiplies the target pixel 301 in the input image (HDR composite image 300) by the gain (set value/low-frequency component value) generated by the control gain generation unit 251 (step S511).

Furthermore, in a case where the high-frequency component HF1 is greater than the threshold value TH3 (step S507), the mask processing unit 252 verifies whether or not the high-frequency component HF1 is greater than the threshold value TH4 (step S508). Then, in a case where the high-frequency component HF1 is greater than the threshold value TH4 (step S508), it is specified to turn off the correction process (step S510). In this case, the gain by which the target pixel 301 in the input image (HDR composite image 300) is to be multiplied is defined as one (step S510).

In addition, in a case where the high-frequency component HF1 is equal to or smaller than the threshold value TH4 (step S508), the mask processing unit 252 specifies to perform the blending process for the image (step S509). This blending process is performed on the basis of the blend ratio BR1 calculated using formula 2 described above.

In this manner, the image processing unit 200 can correct the level of the target pixel 301 constituting the HDR composite image 300 (illustrated in FIG. 3A) on the basis of the low-frequency component in the peripheral image of the target pixel 301. Specifically, the image processing unit 200 can correct the level of the target pixel 301 on the basis of the low-frequency component in the peripheral image of the target pixel 301 (the peripheral image 312 of the target pixel 311 in the long-time aggregated image 310 (illustrated in FIG. 3B) corresponding to the target pixel 301).

In this case, the image processing unit 200 generates a gain for correcting the level of the target pixel 301 on the basis of the low-frequency component in the peripheral image of the target pixel 301. Specifically, the image processing unit 200 uses, as the peripheral image of the target pixel 301, the peripheral image 312 of the target pixel 311 in the long-time aggregated image 310 (illustrated in FIG. 3B) corresponding to the target pixel 301 to generate the gain for correcting the level of the target pixel 301.

Furthermore, the image processing unit 200 does not correct the level of the target pixel in a case where the level of the target pixel is small with respect to a first threshold value (threshold value TH1) as a reference, and can correct the level of the target pixel in a case where the level of the target pixel is large with respect to a second threshold value (threshold value TH2) as a reference. Specifically, the image processing unit 200 does not correct the level of the target pixel 301 in a case where the level of the target pixel 321 in the short-time aggregated image 320 (illustrated in FIG. 3C) corresponding to the target pixel 301 of the HDR composite image 300 is small with respect to the first threshold value (threshold value TH1) as a reference. On the other hand, the image processing unit 200 corrects the level of the target pixel 301 in a case where the level of the target pixel 321 in the short-time aggregated image 320 corresponding to the target pixel 301 of the HDR composite image 300 is large with respect to the second threshold value (threshold value TH2) as a reference.

In addition, in a case where the level of the target pixel is contained in a predetermined range with respect to the first threshold value (threshold value TH1) and the second threshold value (threshold value TH2) as references, the image processing unit 200 can specify whether or not to correct the level of the target pixel on the basis of the high-frequency component in the peripheral image of the target pixel. Here, the predetermined range with respect to the first threshold value (threshold value TH1) and the second threshold value (threshold value TH2) as references is, for example, a range from the threshold value TH1 to the threshold value TH2 illustrated in FIG. 4A. Then, in a case where the level of the target pixel 321 is contained in the above-mentioned range, the image processing unit 200 specifies whether or not to correct the level of the target pixel 301 on the basis of the high-frequency component in the peripheral image 322 of the target pixel 321.

In this case, the image processing unit 200 can correct the level of the target pixel in a case where the high-frequency component in the peripheral image of the target pixel is small with respect to the third threshold value (threshold value TH3) as a reference. On the other hand, the image processing unit 200 can restrain the level of the target pixel from being corrected in a case where the above-mentioned high-frequency component is large with respect to the fourth threshold value (threshold value TH4) as a reference. Specifically, the image processing unit 200 corrects the level of the target pixel 301 in a case where the high-frequency component in the peripheral image 322 of the target pixel 321 is small with respect to the third threshold value (threshold value TH3) as a reference. On the other hand, the image processing unit 200 does not correct the level of the target pixel 301 in a case where the above-mentioned high-frequency component is large with respect to the fourth threshold value (threshold value TH4) as a reference.

Furthermore, the image processing unit 200 performs the blending process in a case where the high-frequency component in the peripheral image of the target pixel is contained in a predetermined range with respect to the third threshold value (threshold value TH3) and the fourth threshold value (threshold value TH4) as references. This blending process is a process of blending the target pixel 301 (illustrated in FIG. 3A) whose level has been corrected and the target pixel 301 whose level has not been corrected. Here, the predetermined range with respect to the third threshold value (threshold value TH3) and the fourth threshold value (threshold value TH4) as references is, for example, a range from the threshold value TH3 to the threshold value TH4 illustrated in FIG. 5A. Then, in a case where the high-frequency component in the peripheral image 322 of the target pixel 321 (illustrated in FIG. 3C) in the short-time aggregated image 320 is contained in the above-mentioned range, the image processing unit 200 performs the blending process.

Note that, although the respective steps of the processing procedure have been indicated in chronological order in FIGS. 7 and 8, the order of the respective steps of the processing procedure is not limited to the examples illustrated in FIGS. 7 and 8. For example, respective steps S501, S503, and S504 of the processing procedure may be performed simultaneously (or substantially simultaneously). Furthermore, in a case where it is specified to turn off the correction process, it is not necessary to generate the gain. Therefore, in a case where it is specified to turn off the correction process, respective processes (steps S501 and S502) relating to the generation of the gain may be omitted.

Example of Images as Targets of Object Recognition Process

Figure 9A:
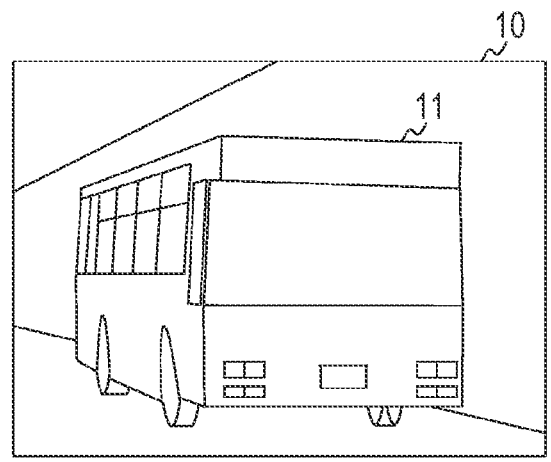
FIGS. 9A and 9B are simplified diagrams illustrating an example of images generated by the imaging device 100 according to the first embodiment of the present disclosure.
Figure 9B:
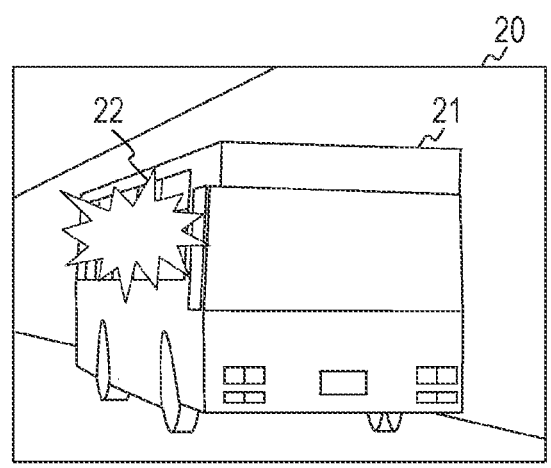

FIGS. 9A and 9B are simplified diagrams illustrating an example of images generated by the imaging device 100 according to the first embodiment of the present disclosure. Images 10 and 20 illustrated in FIGS. 9A and 9B are images obtained by imaging buses 11 and 21 running on the road as subjects.

It is supposed that the image 10 illustrated in FIG. 9A is an image obtained by imaging a state of the bus 11 in which light is not reflected on the window glass, whereas the image 20 illustrated in FIG. 9B is an image obtained by imaging a state of the bus 21 in which strong light hits the window glass and the light is reflected. Note that, in FIG. 9B, for ease of explanation, the light reflected on the window glass is schematically indicated by a graphic form 22.

Here, with reference to FIGS. 9A and 9B, it is assumed that object recognition is performed using an image generated by the imaging device 100. Here, a case where object recognition (particularly biometric recognition) is performed using the features of a changing part (for example, an edge) in an image is assumed. Examples of the object recognition using the features of a changing part in an image include CNN, HOG and SIFT mentioned earlier.

For example, depending on the status of the subject, overexposure or underexposure is likely to occur according to the angle and amount of light that hits an object contained in the image generated by the imaging device 100. For example, as illustrated in FIGS. 9A and 9B, in a case where the object recognition using the features of a changing part in an image is performed on the images 10 and 20 imaged from the oblique front of the buses 11 and 21, the angle and amount of light that hits the buses change depending on the roads on which the buses are running and the surrounding environments. For example, in a case where a bus present in a dark environment at midnight is imaged, there is a possibility that the area other than the inside of the bus results in pitch-black color and the bus is recognized as an object in a different category. Furthermore, as illustrated in FIG. 9B, in a case where the bus 21 in which strong light hits the window glass and the light is reflected is imaged, there is a possibility that the light reflected from the window glass gives interference to erase the feature quantity of the bus 21, and the bus 21 is recognized as an object in a different category.

Thus, in a case where object recognition using the features of a changing part in an image is performed, it is important to use an image without overexposure or underexposure. Accordingly, for example, it is conceivable to use an HDR composite image generated by HDR composition between a long-exposure image and a short-exposure image generated by imaging processes with different exposure times (an image converted into a low-gradation format by gradation compression using tone reduction). For example, when a scene having a large difference between light and dark (for example, a backlit scene) is concerned, this HDR composite image can properly reproduce such a scene. However, in order to properly reproduce such a scene, information on light that hits an object remains in the HDR composite image (that is, the influence of the light remains). Furthermore, there is a possibility that the feature quantity in the image changes due to gradation compression using tone reduction. For these reasons, in a case where object recognition using the features of a changing part in an image is performed, there is a possibility that the recognition rate is deteriorated due to the feature quantity that changes depending on tone reduction and the information on light (the influence of light) that hinders object recognition.

Here, in a case where object recognition using the features of a changing part in an image is performed, information on light is unnecessary. Thus, in the present disclosure, unnecessary information on light is eliminated in order to prevent the deterioration of the recognition rate of object recognition using the features of a changing part in an image. Specifically, a region affected by light is extracted from an image that is a target of object recognition using the features of a changing part in an image, and while the features of an object are retained in the affected region, a component affected by light (for example, the illumination component) is replaced with a flat light component. Consequently, it is possible to increase the recognition rate in the case of performing object recognition that does not require information on light (object recognition using the features of a changing part in an image).

As described above, in the present disclosure, by increasing the dynamic range, the degradation of the recognition rate of the object recognition can be prevented even in a situation where diverse kinds of light hit an object and greatly affect the object recognition, and the conversion of the image into a low-gradation format is allowed.

2. Second Embodiment

In the first embodiment, an example has been demonstrated for image data output from the sensor 110, in which the exposure control unit 120 generates image data of each of the short-time aggregated image and the long-time aggregated image, and the HDR composition unit 130 generates image data of the HDR composite image. In contrast to this, in a second embodiment of the present disclosure, an example will be demonstrated for image data output from a sensor 610, in which a light/dark separation unit 620 generates respective pieces of image data that individually correspond to the short-time aggregated image and the long-time aggregated image.

[Configuration of Imaging Device]

Figure 10:
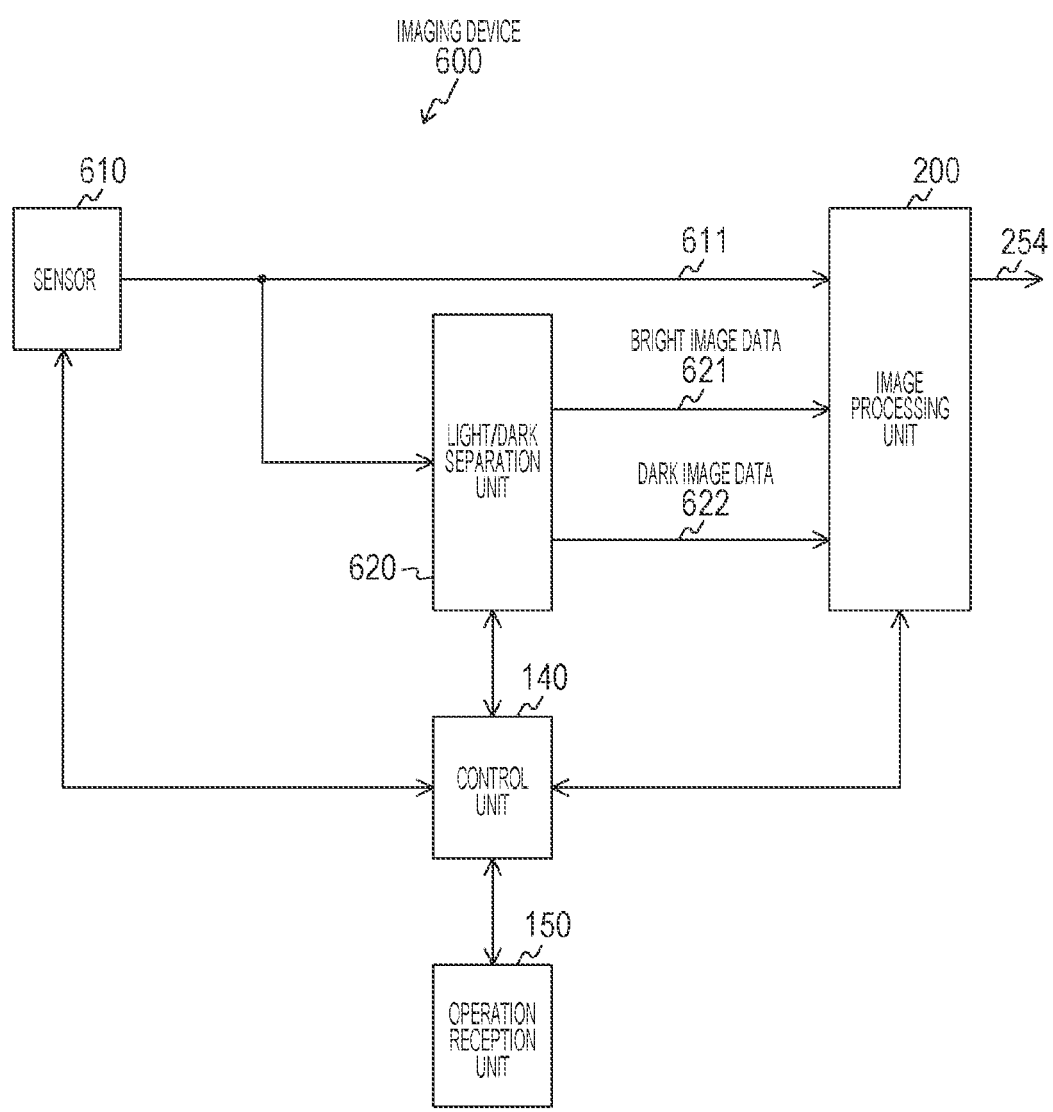
FIG. 10 is a diagram illustrating a configuration example of an imaging device 600 according to a second embodiment of the present disclosure.

FIG. 10 is a diagram illustrating a configuration example of an imaging device 600 according to the second embodiment of the present disclosure.

The imaging device 600 includes the sensor 610, the light/dark separation unit 620, the control unit 140, the operation reception unit 150, and the image processing unit 200. The imaging device 600 is different from the imaging device 100 in that the imaging device 600 includes the light/dark separation unit 620 instead of the exposure control unit 120 and the HDR composition unit 130, as relative to the imaging device 100 illustrated in FIG. 1. Note that, since the parts except these points are similar to those of the imaging device 100 illustrated in FIG. 1, the parts common to the imaging device 100 are denoted by the same reference numerals and the description thereof will be omitted.

The sensor 610 is an imaging element that converts light on a subject incident through a lens into an electrical signal, and outputs the converted electrical signal (image data) to the image processing unit 200 and the light/dark separation unit 620 via a signal line 611, under the control of the control unit 140.

The light/dark separation unit 620 uses the electrical signal (image data) output from the sensor 610 to generate image data of a plurality of images having different setting conditions (a dark image and a bright image), under the control of the control unit 140. Then, the light/dark separation unit 620 outputs the generated image data of the bright image to the image processing unit 200 via a signal line 621, and outputs the generated image data of the dark image to the image processing unit 200 via a signal line 622. Note that the dark image corresponds to the short-time aggregated image indicated in the first embodiment, and the bright image corresponds to the long-time aggregated image indicated in the first embodiment.

For example, the light/dark separation unit 620 generates, as the bright image, an image obtained by clipping the image (image data) output from the sensor 610 with a predetermined gradation. Furthermore, the light/dark separation unit 620 generates, as the dark image, an image obtained by dividing the image (image data) output from the sensor 610 by a predetermined value.

The image processing unit 200 subjects the image data output from the sensor 610 via the signal line 611 to an image process, using the image data of the plurality of images (the dark image and the bright image) output from the light/dark separation unit 620. Since this image process is similar to the process indicated in the first embodiment, the description thereof will be omitted here.

3. Third Embodiment

In the first and second embodiments, examples of using the image data output from one sensor have been demonstrated. In contrast to this, in a third embodiment of the present disclosure, an example of using image data output from a plurality of sensors will be demonstrated.

[Configuration of Imaging Device]

Figure 11:
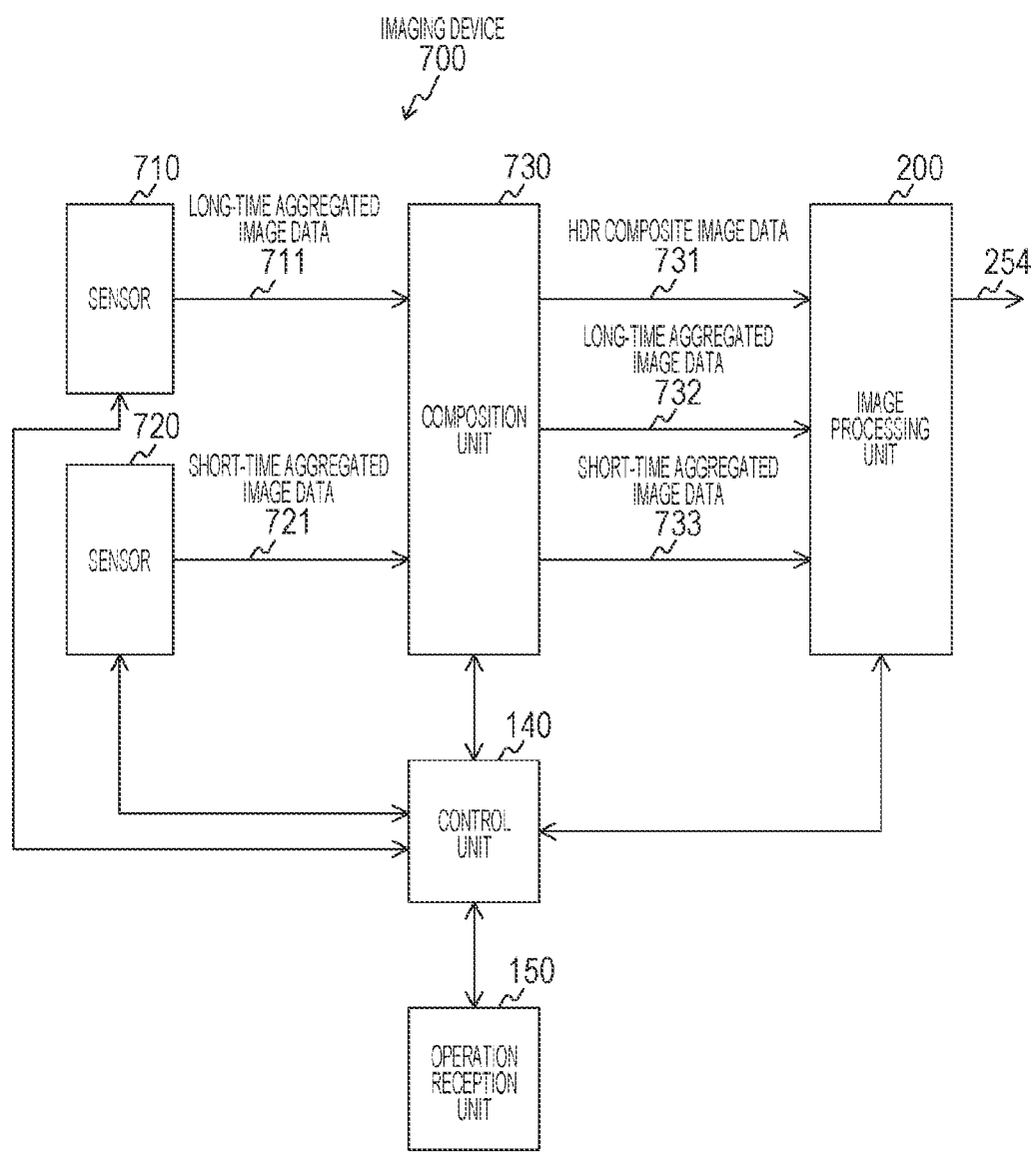
FIG. 11 is a diagram illustrating a configuration example of an imaging device 700 according to a third embodiment of the present disclosure.

FIG. 11 is a diagram illustrating a configuration example of an imaging device 700 according to the third embodiment of the present disclosure.

The imaging device 700 includes sensors 710 and 720, a composition unit 730, the control unit 140, the operation reception unit 150, and the image processing unit 200. The imaging device 700 is different from the imaging device 100 in that the imaging device 700 includes the composition unit 720 instead of the exposure control unit 120 and the HDR composition unit 130, and includes a plurality of the sensors 710 and 720, as relative to the imaging device 100 illustrated in FIG. 1. Note that, since the parts except these points are similar to those of the imaging device 100 illustrated in FIG. 1, the parts common to the imaging device 100 are denoted by the same reference numerals and the description thereof will be omitted.

The sensors 710 and 720 generate image data of a plurality of images having different exposure conditions (a short-time aggregated image and a long-time aggregated image), under the control of the control unit 140. For example, the sensor 710 generates image data of the long-time aggregated image, and outputs the generated image data (long-time aggregated image) to a signal line 711. Furthermore, the sensor 720 generates image data of the short-time aggregated image, and outputs the generated image data (short-time aggregated image) to a signal line 721.

The composition unit 730 generates an HDR composite image by performing an HDR composition process on the image data (the short-time aggregated image and the long-time aggregated image) output from the sensors 710 and 720, under the control of the control unit 140. For example, in a case where the level of a target pixel in the long-time aggregated image exceeds a reference value, the composition unit 730 performs a correction process based on the short-time aggregated image at the same coordinates as the coordinates of the target pixel. Then, the composition unit 730 outputs the generated HDR composite image to the image processing unit 200 via a signal line 731. The composition unit 730 also outputs image data of the images (the short-time aggregated image and the long-time aggregated image) output from the sensors 710 and 720 before the HDR composition process is performed, to the image processing unit 200. That is, the composition unit 730 outputs the image data of the long-time aggregated image to the image processing unit 200 via a signal line 732, and outputs the image data of the short-time aggregated image to the image processing unit 200 via a signal line 733.

The image processing unit 200 subjects the image data output from the composition unit 730 via the signal line 731 to an image process, using the image data of a plurality of the other images (the short-time aggregated image and the long-time aggregated image) output from the composition unit 730. Since this image process is similar to the process indicated in the first embodiment, the description thereof will be omitted here.

4. Fourth Embodiment

In the first to third embodiments, examples of subjecting to the image process using the image data of the bright image (long-time aggregated image) and the dark image (short-time aggregated image) have been demonstrated. In contrast to this, in a fourth embodiment of the present disclosure, an example of using visible light data and non-visible light data will be demonstrated.

[Configuration of Imaging Device]

Figure 12:
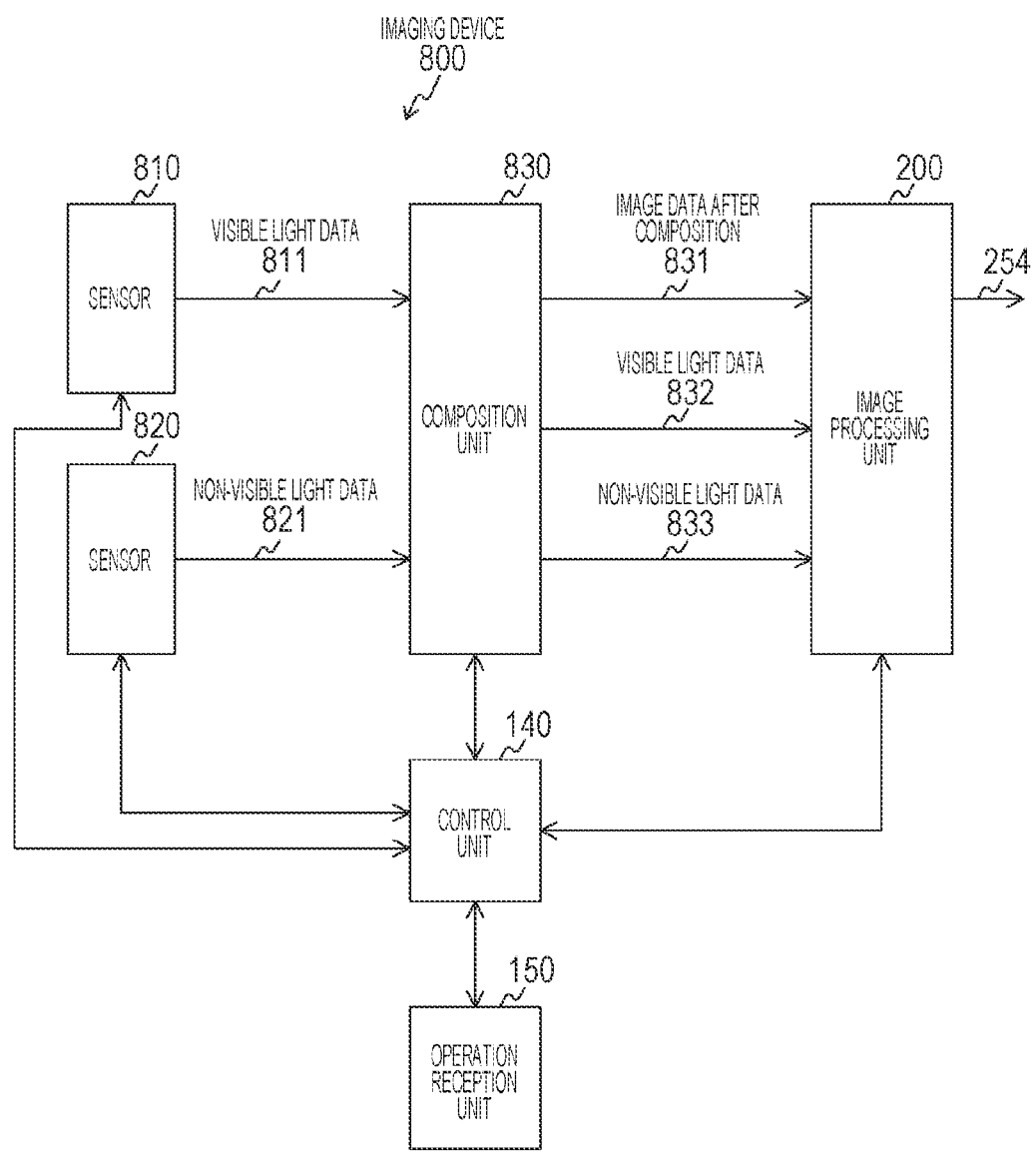
FIG. 12 is a diagram illustrating a configuration example of an imaging device 800 according to a fourth embodiment of the present disclosure.

FIG. 12 is a diagram illustrating a configuration example of an imaging device 800 according to the fourth embodiment of the present disclosure.

The imaging device 800 includes sensors 810 and 820, a composition unit 830, the control unit 140, the operation reception unit 150, and the image processing unit 200. The imaging device 800 is different from the imaging device 700 in that the imaging device 800 includes the sensors 810 and 820 that output visible light data and non-visible light data, instead of the sensors 710 and 720 that output respective pieces of image data of the short-time aggregated image and the long-time aggregated image. Note that, since the parts except these points are similar to those of the imaging device 700 illustrated in FIG. 11, the parts common to the imaging device 700 are denoted by the same reference numerals and the description thereof will be omitted.

The sensors 810 and 820 generate visible light data and non-visible light data under the control of the control unit 140. For example, the sensor 810 generates visible light data and outputs the generated visible light data to a signal line 811. Furthermore, the sensor 820 generates non-visible light data and outputs the generated non-visible light data to a signal line 821. Note that the non-visible light data includes, for example, image data by infrared light or ultraviolet light.

The composition unit 830 generates a composite image by performing a predetermined composition process on the image data (the visible light data and the non-visible light data) output from the sensors 810 and 820, under the control of the control unit 140. Then, the composition unit 830 outputs the generated composite image to the image processing unit 200 via a signal line 831. The composition unit 830 also outputs image data of the images (the visible light data and the non-visible light data) output from the sensors 810 and 820 before the composition process is performed, to the image processing unit 200. That is, the composition unit 830 outputs the visible light data to the image processing unit 200 via a signal line 832, and outputs the non-visible light data to the image processing unit 200 via a signal line 833.

The image processing unit 200 subjects the image data output from the composition unit 830 via the signal line 831 to an image process, using the visible light data and the non-visible light data output from the composition unit 830. For example, the edge level can be acquired on the basis of the non-visible light data. Therefore, information regarding an object that cannot be seen with visible light can be obtained using the edge level that can be acquired on the basis of the non-visible light data. Thus, the image processing unit 200 acquires the brightness (the level of the target pixel) and the low-frequency component on the basis of the visible light data, and acquires the edge level on the basis of the non-visible light data. Then, the image processing unit 200 can verify whether or not to turn on or off the correction process, on the basis of the brightness (the level of the target pixel) and the edge level.

Note that the imaging devices indicated in the present disclosure can be applied to a digital still camera, a digital video camera (for example, a camera-integrated recorder), a surveillance device, and the like.

Lastly, the description of each of the above embodiments is an example of the present disclosure, and the present disclosure is not limited to the above embodiments. For this reason, it goes without saying that a variety of alterations can be made according to the design and the like, other than the respective embodiments described above, as long as the alterations do not depart from the technological idea of the present disclosure.

Furthermore, the drawings in the above embodiments are schematic, and the dimensional ratios and the like of respective units do not always match actual ones. In addition, it is needless to say that the drawings each include parts having dimensional relationships and ratios different between the respective drawings.

Meanwhile, the processing procedures described in the above embodiments may be regarded as a method having these series of procedures and additionally, may be regarded as a program for causing a computer to execute these series of procedures or as a recording medium storing the program. For example, a compact disc (CD), a digital versatile disc (DVD), a memory card, or the like can be used as this recording medium.

Note that the present technology can be also configured as described below.

(1) An image processing device including an image processing unit that corrects a level of a target pixel constituting an image, on the basis of a low-frequency component in a peripheral image of the target pixel.

(2) The image processing device according to (1) above, in which the image processing unit does not correct the level of the target pixel in a case where the level of the target pixel is small with respect to a first threshold value as a reference, and corrects the level of the target pixel in a case where the level of the target pixel is large with respect to a second threshold value as a reference, the second threshold value being a value larger than the first threshold value.

(3) The image processing device according to (2) above, in which the image processing unit specifies whether or not to correct the level of the target pixel, on the basis of a high-frequency component in a peripheral image of the target pixel in a case where the level of the target pixel is contained in a predetermined range with respect to the first threshold value and the second threshold value as references.

(4) The image processing device according to (3) above, in which the image processing unit corrects the level of the target pixel in a case where the high-frequency component is small with respect to a third threshold value as a reference, and does not correct the level of the target pixel in a case where the high-frequency component is large with respect to a fourth threshold value as a reference, the fourth threshold value being a value larger than the third threshold value.

(5) The image processing device according to (4) above, in which the image processing unit performs a blending process of blending the target pixel whose level has been corrected and the target pixel whose level has not been corrected in a case where the high-frequency component is contained in a predetermined range with respect to the third threshold value and the fourth threshold value as references.

(6) The image processing device according to any one of (1) to (5) above, which generates a gain for correcting the level of the target pixel on the basis of the low-frequency component.

(7) The image processing device according to (1) above, in which the image includes a composite image generated by compositing a first image and a second image, which is a darker image than the first image, the first image and the second image having been generated under different conditions, and the image processing unit corrects a level of the target pixel constituting the composite image on the basis of a low-frequency component in a peripheral image of a first pixel of the first image corresponding to the target pixel.

(8) The image processing device according to (7) above, in which the image processing unit does not correct the level of the target pixel constituting the composite image in a case where a level of the second pixel of the second image corresponding to the target pixel is small with respect to the first threshold value as a reference, and corrects the level of the target pixel in a case where the level of the second pixel is large with respect to the second threshold value as a reference, the second threshold value being a value larger than the first threshold value.

(9) The image processing device according to (8) above, in which the image processing unit specifies whether or not to correct the level of the target pixel constituting the composite image, on the basis of a high-frequency component in a peripheral image of the second pixel in a case where the level of the second pixel is contained in a predetermined range with respect to the first threshold value and the second threshold value as references.

(10) The image processing device according to (9) above, in which the image processing unit corrects the level of the target pixel constituting the composite image in a case where the high-frequency component is small with respect to the third threshold value as a reference, and does not correct the level of the target pixel in a case where the high-frequency component is large with respect to the fourth threshold value as a reference, the fourth threshold value being a value larger than the third threshold value.

(11) The image processing device according to (10) above, in which the image processing unit performs a blending process of blending the target pixel constituting the composite image whose level has been corrected and the target pixel whose level has not been corrected in a case where the high-frequency component is contained in a predetermined range with respect to the third threshold value and the fourth threshold value as references.

(12) The image processing device according to any one of (7) to (11) above, in which the image processing unit generates a gain for correcting the level of the target pixel constituting the composite image on the basis of the low-frequency component in the peripheral image of the first pixel.

(13) An image processing method including correcting a level of a target pixel constituting an image, on the basis of a low-frequency component in a peripheral image of the target pixel.

REFERENCE SIGNS LIST

100, 600, 700, 800 Imaging device
110, 610, 710, 720, 810, 820 Sensor
120 Exposure control unit
130 HDR composition unit
140 Control unit
150 Operation reception unit
200 Image processing unit
210 Level determination unit
220 Edge and texture determination unit
221, 231 Peripheral image acquisition unit
222 High-frequency component extraction unit
230 Illumination component extraction unit
232 Low-frequency component extraction unit
240 Correction value setting unit
250 Correction processing unit
251 Control gain generation unit
252 Mask processing unit
253 Multiplier
620 Light/dark separation unit
730, 830 Composition unit

The invention claimed is:

1. An image processing device, comprising:
circuitry configured to:
not correct a level of a target pixel of an image in a case where the level of the target pixel is smaller than a first threshold value,
wherein the image includes a first peripheral image around the target pixel with the target pixel as a center; and
correct the level of the target pixel of the image in a case where the level of the target pixel is larger than a second threshold value, wherein
the second threshold value is larger than the first threshold value, and
the correction is based on a low-frequency component in the first peripheral image around the target pixel.

2. The image processing device according to claim 1, wherein the circuitry is further configured to specify whether to correct the level of the target pixel, based on a high-frequency component in a second peripheral image around the target pixel in the image in a case where the level of the target pixel is contained in a first range with respect to the first threshold value and the second threshold value as references.

3. The image processing device according to claim 2, wherein the circuitry is further configured to:
correct the level of the target pixel in a case where the high-frequency component is smaller than a third threshold value, and
not correct the level of the target pixel in a case where the high-frequency component is larger than a fourth threshold value, the fourth threshold value being larger than the third threshold value.

4. The image processing device according to claim 3, wherein the circuitry is further configured to blend the target pixel whose level has been corrected and the target pixel whose level has not been corrected in a case where the high-frequency component is contained in a second range with respect to the third threshold value and the fourth threshold value as references.

5. The image processing device according to claim 1, wherein the circuitry is further configured to generate, based on the low-frequency component, a gain for the correction of the level of the target pixel.

6. An image processing device, comprising:
circuitry configured to:
generate a composite image by composition of a first image and a second image, wherein
the second image is a darker image than the first image,
the first image and the second image are generated under different conditions,
the composite image includes a target pixel,
the first image includes a first pixel and a first peripheral image around the first pixel, and
the first pixel of the first image corresponds to the target pixel of the composite image; and
correct a level of the target pixel of the composite image, based on a low-frequency component in the first peripheral image around the first pixel corresponding to the target pixel.

7. The image processing device according to claim 6, wherein the circuitry is further configured to:
not correct the level of the target pixel of the composite image in a case where a level of a second pixel of the second image corresponding to the target pixel is smaller than a first threshold value, and
correct the level of the target pixel in a case where the level of the second pixel is larger than a second threshold value, the second threshold value being larger than the first threshold value.

8. The image processing device according to claim 7, wherein the circuitry is further configured to specify whether to correct the level of the target pixel of the composite image, based on a high-frequency component in a second peripheral image around the second pixel in a case where the level of the second pixel is contained in a first range with respect to the first threshold value and the second threshold value as references.

9. The image processing device according to claim 8, wherein the circuitry is further configured to:
correct the level of the target pixel of the composite image in a case where the high-frequency component is smaller than a third threshold value, and
not correct the level of the target pixel in a case where the high-frequency component is larger than a fourth threshold value, the fourth threshold value being larger than the third threshold value.

10. The image processing device according to claim 9, wherein the circuitry is further configured to blend the target pixel of the composite image whose level has been corrected and the target pixel whose level has not been corrected in a case where the high-frequency component is contained in a second range with respect to the third threshold value and the fourth threshold value as references.

11. The image processing device according to claim 6, wherein the circuitry is further configured to generate, based on the low-frequency component in the first peripheral image around the first pixel, a gain for the correction of the level of the target pixel of the composite image.

12. An image processing method, comprising:
generating a composite image by compositing a first image and a second image, wherein
the second image is a darker image than the first image,
the first image and the second image are generated under different conditions,
the composite image includes a target pixel,
the first image includes a first pixel and a peripheral image around the first pixel, and
the first pixel of the first image corresponds to the target pixel of the composite image; and
correcting a level of the target pixel of the composite image, based on a low-frequency component in the peripheral image around the first pixel.

\* \* \* \* \*